United States Patent
Khen et al.

(10) Patent No.: US 8,528,049 B1
(45) Date of Patent: Sep. 3, 2013

(54) TECHNIQUES OF PROVIDING AUTHENTICATION FROM COMPUTER POINTER INTERACTIONS

(75) Inventors: Amnon Khen, Tel Aviv (IL); Roy Hodgman, Wenham, MA (US); Alon Kaufman, Bnei-Dror (IL)

(73) Assignee: EMC Corporation, Hopkinton, MA (US)

( * ) Notice: Subject to any disclaimer, the term of this patent is extended or adjusted under 35 U.S.C. 154(b) by 356 days.

(21) Appl. No.: 12/974,732

(22) Filed: Dec. 21, 2010

(51) Int. Cl.
*H04L 29/06* (2006.01)

(52) U.S. Cl.
USPC .............................. 726/2; 382/119; 382/187

(58) Field of Classification Search
USPC ..................................... 726/2; 382/119, 187
See application file for complete search history.

(56) References Cited

U.S. PATENT DOCUMENTS

| 7,953,219 | B2 | 5/2011 | Freedman et al. | |
| 8,161,530 | B2 | 4/2012 | Meehan et al. | |
| 8,176,563 | B2 | 5/2012 | Redlich et al. | |
| 8,182,346 | B2 | 5/2012 | Herrmann et al. | |
| 2003/0103653 | A1 * | 6/2003 | Avni et al. | 382/119 |

\* cited by examiner

*Primary Examiner* — Jeffrey Pwu
*Assistant Examiner* — Thong Truong
(74) *Attorney, Agent, or Firm* — BainwoodHuang

(57) ABSTRACT

A technique provides user authentication. The technique involves generating a pointer data profile entry in a pointer data profile database, the pointer data profile entry having a pointer data profile which is based on first pointer data obtained during a first user session. Such pointer data can be collected from a standard pointing device such as an electronic mouse, a touch-based track pad, a trackball, a scroll wheel, etc. The technique further involves receiving new pointer data during a second user session, and performing an authentication operation based on (i) the pointer data profile entry in the pointer data profile database and (ii) the new pointer data to determine whether a user providing the first pointer data during the first user session and a user providing the new pointer data during the second user session is the same person.

22 Claims, 5 Drawing Sheets

TECHNIQUES OF PROVIDING AUTHENTICATION FROM COMPUTER POINTER INTERACTIONS

BACKGROUND

In general, authentication is the act of confirming the identity of a person such as a computer user. A simple approach for a computer to authenticate a user is for the computer to prompt the user for a username and password.

Multi-factor computerized authentication involves delivery of more than one authentication factor by the user. One factor may be something that the user knows such as a password. Another factor may be something the user has such as a keycard. A third factor may be something the user is such as a scan of some part of the user's body such as a fingerprint scan or an eye scan.

The latter two require deployment of additional devices at the user's side. To deliver a fingerprint scan to a computer, the user typically runs a finger over a fingerprint scanner which reads the user's fingerprint from the user's finger. Similarly, to deliver an eye scan to a computer, the user typically looks into an eye scanner which captures an image of the user's iris or retina.

SUMMARY

Unfortunately, there are deficiencies to the above-described conventional authentication approaches. For example, the above-described conventional approach of simply prompting a user for a username and password requires the user to remember the password. If the password is static, the user may need to periodically change an old password to a new password in order to strengthen security, thus burdening the user with having to remember new passwords while disregarding old passwords. Additionally, if the password changes routinely (e.g., a one-time password which changes every minute), the user may need to carry a special device (e.g., an authentication token) in order to have access to the current password.

Furthermore, in connection with the above-described conventional approach which requires a user's scan such as a fingerprint scan or an eye scan, the user must have access to specialized hardware (e.g., a fingerprint scanner, an eye scanner, etc.) which is dedicated to capturing the scan from the user. Moreover, some party must incur the cost of obtaining (e.g., purchasing and installing), operating (e.g., training and developing expertise) and maintaining (e.g., cleaning and servicing) the hardware which has no purpose other than to perform authentication. Consequently, the conventional scanning approach is typically characterized as having a high cost and a low use rate. Also, once a third-party obtains a copy of the user's scan (which either cannot be revoked or is painful to alter), the computer is now more vulnerable to an attack.

In contrast to the above-described conventional authentication approaches, an improved technique involves providing user authentication from computer pointer interactions (e.g., a series of mouse movement events). Such pointer interactions can be collected from a standard pointing device such as an electronic mouse, a touch-based track pad, a trackball, a scroll wheel, and the like. First, circuitry creates a user profile from pointer input collected when a user operates the pointing device. Then, during a subsequent user session, the circuitry compares further pointer input collected from the pointing device to the user profile in order to authenticate the user during that subsequent session. Since pointing devices are almost universally deployed within computing devices, there is no need for further specialized hardware. Additionally, how the user interacts with a pointing device is generally difficult to copy or imitate, thus making the pointer interactions a reliable authentication factor. Furthermore, there is typically no expertise required to become proficient at operating and maintaining a pointing device, thus minimizing the training burden, if any, on the user.

One embodiment is directed to a computerized method of providing user authentication. The method includes electronically generating a pointer data profile entry in a pointer data profile database, the pointer data profile entry having a pointer data profile which is based on first pointer data (e.g., mouse movement events) obtained during a first user session (e.g., a previous or historical user session, a special training session, etc.). The method further includes receiving new pointer data during a second user session, and performing an authentication operation based on (i) the pointer data profile entry in the pointer data profile database and (ii) the new pointer data to determine whether a user providing the first pointer data during the first user session and a user providing the new pointer data during the second user session is the same person.

Other embodiments are directed to an electronic authentication system and various apparatus (e.g., a client machine, a server machine, etc.) of the system. Further embodiments are directed to computer program products, as well as other techniques.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Overview

An improved technique involves providing user authentication from computer pointer interactions. Such pointer interactions (e.g., mouse movement events) can be collected from a standard pointing device such as an electronic mouse, a touch-based track pad, a trackball, a scroll wheel, or the like. Initially, electronic circuitry creates a user profile from pointer input collected when a user operates the pointing device. Then, during a subsequent user session, the electronic circuitry compares further pointer input collected from the pointing device during that subsequent session to the user profile to authenticate the user. Since computing devices typically include pointing devices, there is no need for any extra specialized hardware. Additionally, how the user interacts with a pointing device is generally difficult to copy or imitate (i.e., steal) thus making the pointing device interactions a reliable authentication factor. Furthermore, there is typically no expertise or training required to become proficient at operating and maintaining a pointing device thus minimizing the burden, if any, on the user.

Figure 1:
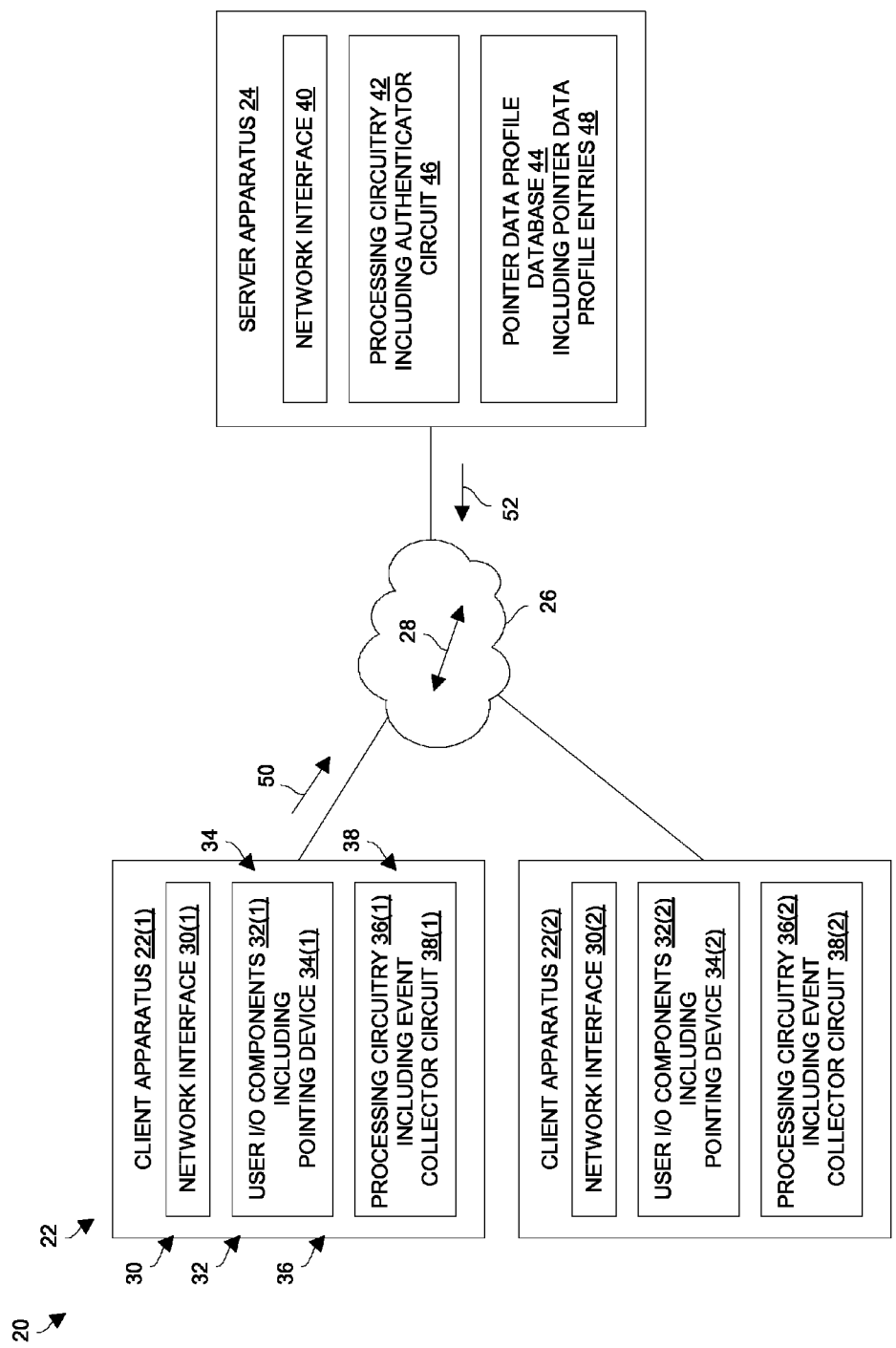
FIG. 1 is a block diagram of an electronic system which provides user authentication from computer pointer interactions.

FIG. 1 shows an electronic environment (or system) 20 which provides user authentication from computer pointer interactions. The electronic environment 20 includes client apparatus 22(1), 22(2), . . . (collectively, clients apparatus 22), a server apparatus 24, and a computer network 26 which enables the apparatus 22, 24 to communicate with each other via electronic signals 28. It should be understood that the computer network 26 is illustrated as a cloud because it is capable of having a variety of topologies including backbone, hub-and-spoke, loop, irregular, a combination of the Internet and LAN(s), combinations thereof, and so on.

Each client apparatus 22 includes a network interface 30, user input/output (I/O) components 32 which includes a pointing device 34, and processing circuitry 36 which includes an event collector circuit 38. For example, client apparatus 22(1) includes a network interface 30(1), user I/O components 32(1) including a pointing device 34(1), and processing circuitry 36(1) including an event collector circuit 38(1). Similarly, client apparatus 22(2) includes a network interface 30(2), user I/O components 32(2) including a pointing device 34(2), and processing circuitry 36(2) including an event collector circuit 38(2), and so on.

The server device 24 includes a network interface 40, processing circuitry 42, and a pointer data profile database 44. The processing circuitry 42 includes an authentication circuit 46. The pointer data profile database 44 includes multiple pointer data profile entries 48 to support multiple users.

In connection with each client apparatus 22, the network interface 30 enables that client apparatus 22 to connect to the computer network 26. As a result, the client apparatus 22 is able to robustly and reliably communicate with other equipment connected to the network 26 such as the server apparatus 24 and, if desired, any of the other client apparatus 22.

The user I/O components 32 of each client apparatus 22 receive user input and provide user output enabling a user to effectively and efficiently operate the client apparatus 22. In particular, the pointing device 34 receives pointer input from the user in order to direct movement of a pointer graphic on an electronic display. Examples of suitable pointing devices 34 include an electronic mouse, a touch-based track pad, a trackball, a scroll wheel, arrow keys on a keyboard, a joystick, infrared and RF pointers, combinations thereof, and the like.

The processing circuitry 36 of each client apparatus 22 performs operations enabling the user to perform useful work and/or derive entertainment (e.g., to run user-level applications, to access websites online, to play video games, etc.). The event collector circuit 38, which preferably runs in the background so that it's operation is substantially transparent to the user, is constructed and arranged to collect pointer data 50 from the pointing device 34, and provide that pointer data 50 to the server apparatus 24.

The pointer data 50 includes a sequence of raw mouse movement events (i.e., sampled pointer locations and time stamps) from the user's operation of the pointing device 34 when moving an electronically displayed pointer graphic, and such pointer data 50 defines how the user interacts with the pointing device 34. For example, the user may operate the pointing device 34 slowly and deliberately as opposed to quickly and sporadically. Similarly, the user may tend to move the pointing device 34 in straight lines or in arcs, and so on. Such types of pointing device operation provide distinct ways of identifying the user.

In connection with the server apparatus 24, the network interface 40 enables the server apparatus 24 to connect to the computer network 26. As a result, the server apparatus 24 is able to robustly and reliably communicate with other equipment on the network 26 such as any client apparatus 22.

The processing circuitry 42 of the server apparatus 24 performs a variety of server operations such as web server operations, database operations, authentication operations, etc.

In connection with authentication operations, the authenticator circuit 44 of the server apparatus 24 is constructed and arranged to (i) create pointer data profiles based on initial user sessions (i.e., previous/historical user sessions) and store the pointer data profiles in the form of pointer data profile entries 48 in the pointer data profile database 46, (ii) perform user authentication using the stored pointer data profiles at the onset of subsequent user sessions, and (iii) continuously perform user authentication during the subsequent user sessions and during further user sessions. Such authentication operations may be particularly useful for controlling certain types of computerized access, e.g., to carry out a financial transaction, to access secure data, to run certain applications, etc.

If authentication is unsuccessful, the authenticator circuit 44 may take remedial steps. In some arrangements, the authenticator circuit 44 prompts a user for a stronger form of authentication. Additionally, in some arrangements, the authenticator circuit 44 terminates the user session. Furthermore, in some arrangements, the authenticator circuit 44 notifies an administrator who may further initiate an investigation. These remedial steps may be performed in combination with each other, or be substituted with other activities, and so on.

It should be understood that, in some situations, authentication may fail due to lack or limited pointer movement. Also, the authentication result may be border-line in which case the user can re-try to authenticate in a subsequent user session. Further details of the client and server apparatus 22, 24 will now be provided with reference to FIGS. 2 and 3.

Further Apparatus Details

Figure 2:
FIG. 2 is a block diagram of a client apparatus of the electronic system of FIG. 1.
Figure 2:
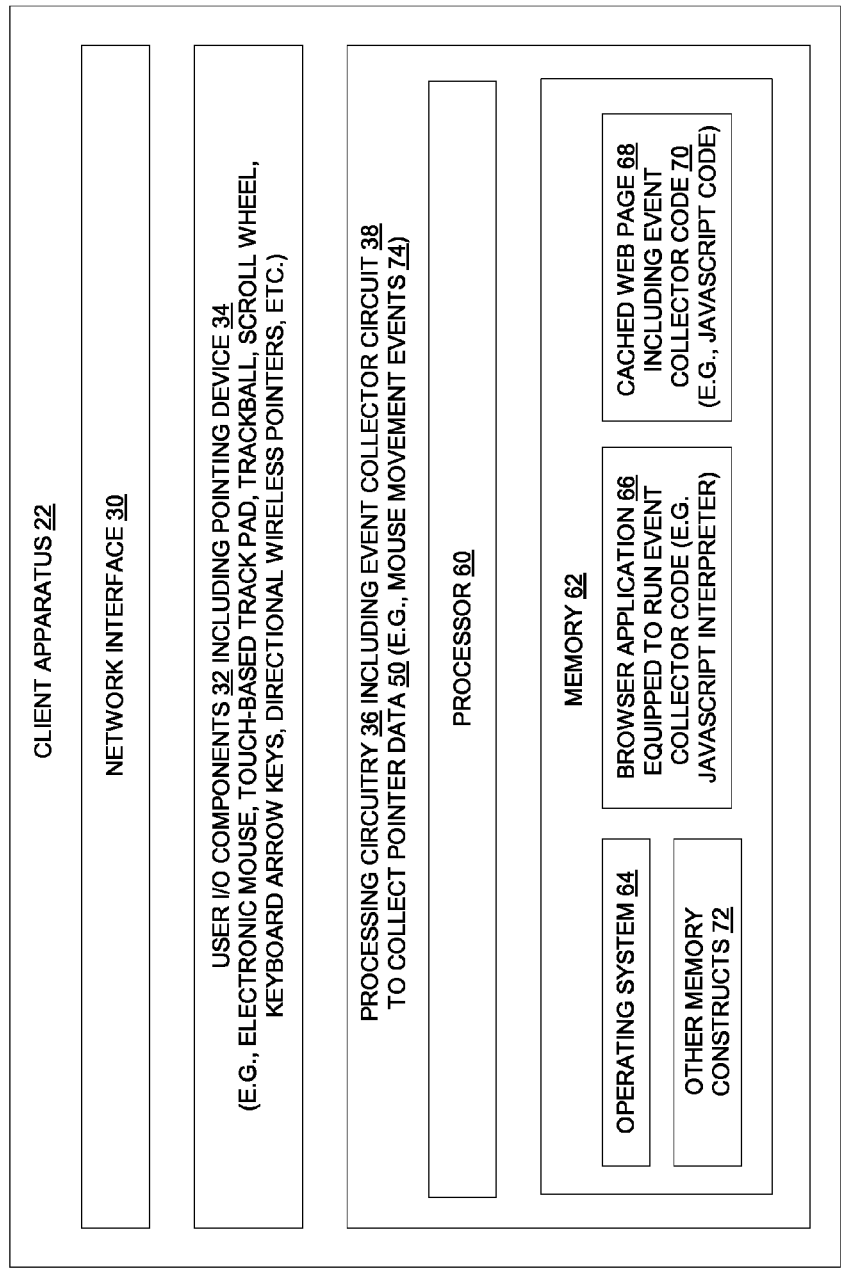

FIG. 2 shows particular low-level details of a client apparatus 22. Likewise, FIG. 3 shows particular low-level details of the server apparatus 24.

With reference to FIG. 2, the processing circuitry 36 of the client apparatus 22 is in electronic communication with the network interface 30 and the user I/O components 32. The processing circuitry 36 includes a processor 60 (e.g., a microprocessor chip set) and memory 62 (e.g., semiconductor memory in combination with magnetic storage). The memory 62 stores an operating system 64 to coordinate computer resources, a browser application 66, cached web pages 68 including event collector code 70, and other memory constructs 72. In some arrangements, the processor 60 operating in accordance with the event collector code 70 forms the event collector circuit 38 which collects pointer data 50, i.e., mouse movement events 74. For example, in some arrangements, a Javascript interpreter of the browser application 66 runs Javascript obtained via a web page request (see cached web page 68). As another example, in some arrangements, a computer program product 76 having a non-transitory computer readable storage medium delivers the event collector code 70 to the memory 62.

Figure 3:
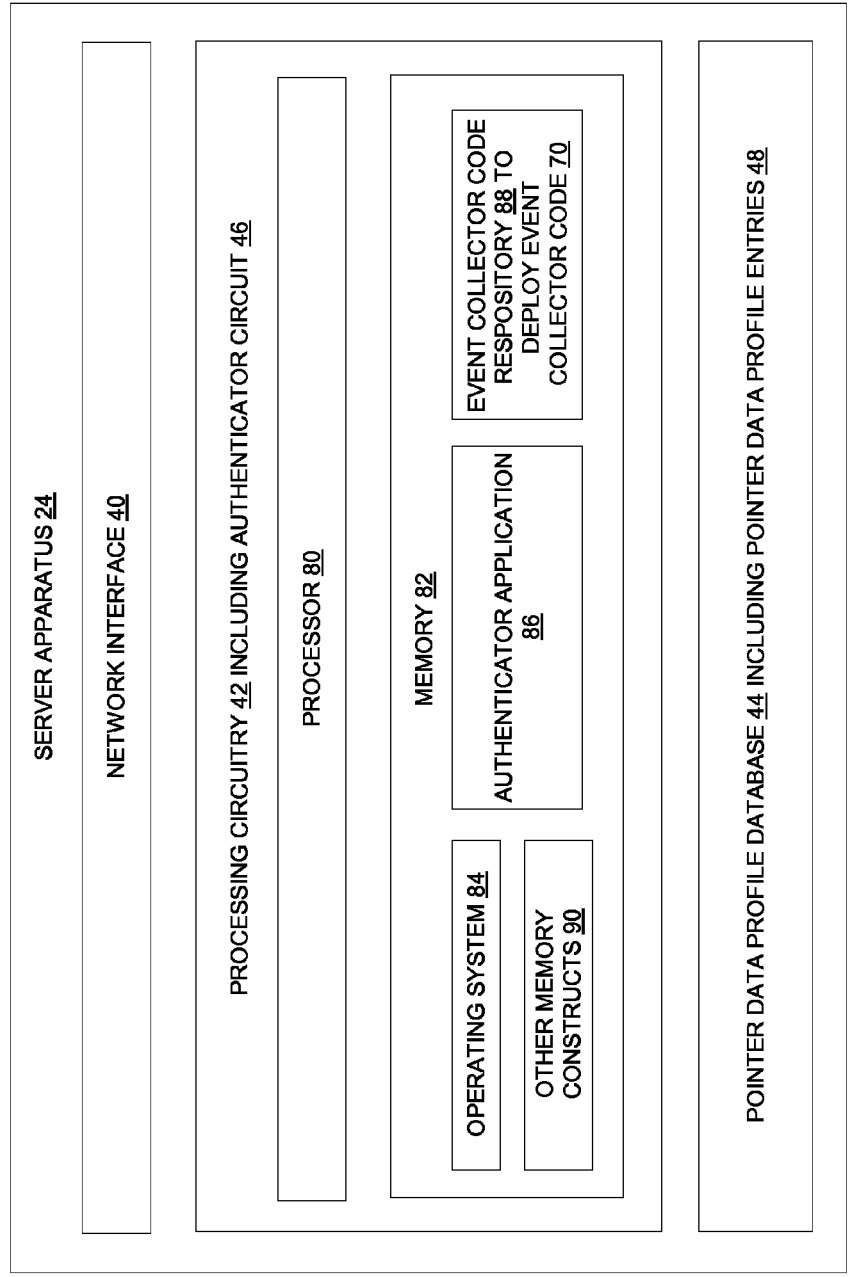
FIG. 3 is a block diagram of a server apparatus of the electronic system of FIG. 1.

Similarly, with reference to FIG. 3, the processing circuitry 42 of the server apparatus 24 is in electronic communication with the network interface 40 and the pointer data profile database 44. The processing circuitry 42 of the server apparatus 42 includes a processor 80 and memory 82. The memory 82 stores an operating system 84 to coordinate computer resources, an authenticator application 86 to perform authentication operations, an event collector code repository 88 to deploy the event collector code 70 (also see FIG. 2), and other memory constructs 90. The processor 80 operating in accordance with the authenticator application 86 forms the authenticator circuit 46. In some arrangements, a computer program product 92 having a non-transitory computer readable storage medium delivers the authenticator application 86 to the memory 82. Suitable forms for a non-transitory computer readable storage medium which delivers executable instructions in a non-volatile manner include CD-ROM, disk memory, tape memory, flash memory, and the like. It should be understood that the authenticator application 86 is also capable of being delivered to the server apparatus 24 over a network.

Further operational details will now be provided in the context of a series of online user sessions. During an online signup session, a user starts working on a client apparatus 22 (FIG. 2). As part of the signup process, the user launches the browser application 66 and navigates to a website of the server apparatus 24 that utilizes user authentication from computer pointer interactions. In some situations, the server apparatus 24 may be a dedicated device which is separate from the actual source device of web pages for the website. For example, the online signup session may involve the user signing up for an online service or opening an online account at the website. As part of this signup activity, the user may create a username and a password in the traditional sense. The username, the password, perhaps some other user identifier, combinations thereof, etc. are suitable for use by the authenticator circuit 46 for establishing an identity for the user.

At some point, the user indicates that he or she would like to create a profile. In response, the authenticator circuit 46 deploys the event collector code 70 from the event collector code repository 88 to the client apparatus 22. As mentioned above, in some arrangements, the event collector code 70 is a script written in a scripting language (e.g., Javascript) for which the browser has an interpreter (e.g., a Javascript interpreter). In other arrangements, the event collector code 70 is delivered and installed via the computer program product 76.

Once the event collector code 70 is loaded on the client apparatus 22, the event collector circuit 38 begins operation by collecting initial pointer data 50 (e.g., an initial sequence of mouse movement events 74 in response to operation of the pointing device 34 by the user). As part of this initial pointer data collection process, the user may be directed through a particular sequence of enrollment steps which involve user operation of the pointing device 34 to direct a pointer graphic on a display. The event collector circuit 38 sends the initial pointer data 50 to the authenticator circuit 46 of the server apparatus 24 through the computer network 26 (also see FIG. 1).

The authenticator circuit 46 receives the initial pointer data 50 generates a pointer data profile entry 48 in the pointer data profile database 44 on behalf of the user. Along these lines, the authenticator circuit 46 combines a user identifier, the results of an analysis of the initial pointer data 50, and perhaps other information to form the pointer data profile entry 48. As will be explained in further detail below, the results can be updated in an ongoing manner, i.e., the pointer profile can be adjusted and fine tuned as new pointer data 50 from new user sessions is added to it.

Figure 4:
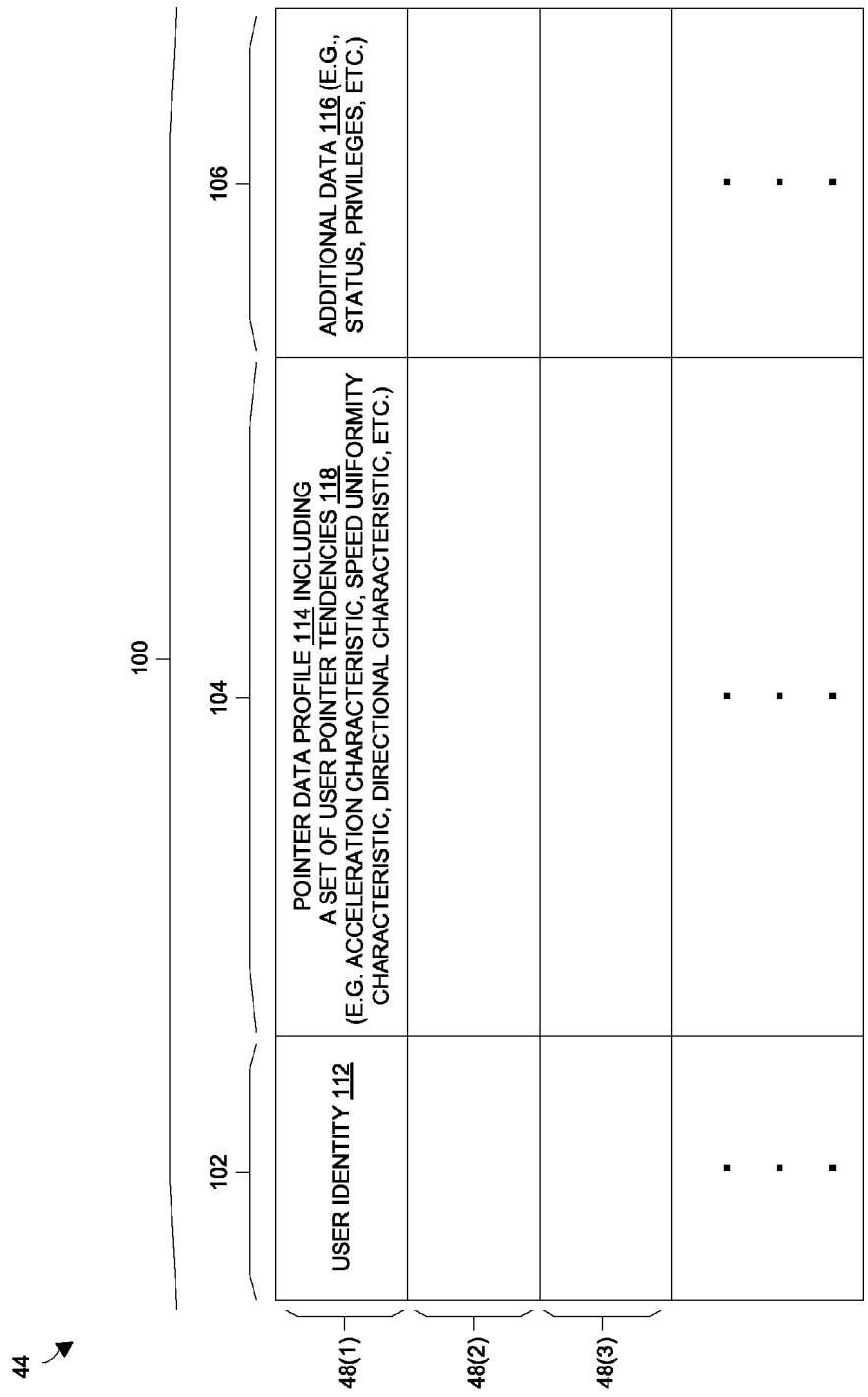
FIG. 4 is a block diagram of a pointer data profile database having pointer data profile entries which is suitable for use by the server apparatus of FIG. 3.

FIG. 4 shows a set of pointer data profile entries 48(1), 48(2), 48(3), . . . of the pointer data profile database 44. The format 100 for a pointer data profile entry 48 includes a user identity field 102, a pointer data profile portion 104, and an additional data section 106.

The user identity field 102 stores a user identity 112 (e.g., a username) which uniquely identifies both the user and the pointer data profile entry 48 among the other pointer data profile entries 48 in the database 44. Accordingly, the authenticator circuit 46 is able to properly locate the pointer data profile entry 48 associated with the user based on the user identity 112. It is quite possible that two pointer data profile entries 48 exist for the same user particularly if the user uses more than one client apparatus 22 or different types of pointing devices 34 that encourage different types of mouse movement habits.

The pointer data profile portion 104 stores a pointer data profile 114 of that user. Each pointer data profile 114 includes a set of user pointer tendencies 118. In some arrangements, the set of user pointer tendencies 118 includes an acceleration characteristic which identifies a pointer acceleration attribute (e.g., parameters indicating whether the user tends to quickly accelerate the pointing device 34, slowly accelerate the pointing device 34, etc.). In some arrangements, the set of user pointer tendencies 118 includes a speed uniformity characteristic which identifies a pointer speed uniformity attribute (e.g., parameters indicating whether the user is consistent with speed of the pointing device 34, erratic, etc.). In some arrangements, the set of user pointer tendencies 118 includes a directional characteristic which identifies a pointer directional attribute (e.g., speed parameters indicating speeds of motion in each direction, shape parameters indicating whether the user tends to move the pointing device 114 in straight lines, in arcs, in loops, etc.). It should be understood that these characteristics are provided by way of example, and that other characteristics are suitable for use as well for the user pointer tendencies 118.

One should appreciate that the various user pointer tendencies 118 are capable of being extracted from the initial pointer data 50 and arranged to form a multi-dimensional space or coordinate system. In such a system, each pointer tendency 118 is represented as a particular vector which is a location in that space. The authenticator circuit 46 is constructed and arranged to analytically derive the user pointer tendencies 118 by applying algorithms to the sequence of mouse movement events 74 of the initial pointer data 50 collected by the event collector circuit 38.

The additional data section 106 includes additional user information such as status (e.g., whether the user is active, inactive, deactivated, under review, etc.). The additional data section 106 may further define particular privileges for the user (e.g., access to certain types of data or web pages, the ability to carry out certain transactions, an amount of time the user is allowed to continue operation, etc.). The additional data section 106 may further include other user credentials, and so on.

Once the authenticator circuit 46 creates and stores the pointer data profile entry 48 in the pointer data profile database 44 on behalf of the user, the system 20 is ready to perform user authentication. Along these lines, when the user starts a subsequent user session which involves operation of the pointing device 34 of the client apparatus 22, the event collector circuit 38 collects subsequent pointer data 50 and sends the subsequent pointer data 50 to the authenticator circuit 46 of the server apparatus 24. The authenticator circuit 46 then performs an authentication operation based on (i) the pointer data profile entry 48 in the pointer data profile database 44 and (ii) the subsequent pointer data 50 to determine whether the user who provided the initial pointer data 50 during the initial user session and the user who provided the subsequent pointer data 50 during the subsequent user session is the same person. If the new pointer data 50 is consistent with the pointer data profile entry 48, user authentication is successful and the authenticator circuit 44 concludes that the source of the initial pointer data 50 and the new pointer data 50 is the same person. In some arrangements, the authenticator circuit 46 updates the pointer data profile entry 48 in the pointer data profile database 44 based on the subsequent pointer data 50.

However, if the new pointer data 50 is inconsistent with the pointer data profile entry 48, user authentication is unsuccessful. In this situation, the authenticator circuit 44 concludes that the initial pointer data 50 and the subsequent pointer data 50 are from different users.

It should be understood that the authenticator circuit 46 is capable of applying the same algorithms that were used to generate the pointer data profile 114 to determine whether the user is the same person that provided the initial pointer data 50. That is, the authentication determination can be analytically made via a comparison between the initial user pointer tendencies 118 based on the initial pointer data 50 and new user pointer tendencies 118 based on the subsequent pointer data 50. If there is a match within a deviation window, the authenticator circuit 46 considers the source of the initial pointer data 50 and the subsequent pointer data 50 to be the same person. However, if there is not a match within the deviation window, the authenticator circuit 46 considers the sources of the initial pointer data 50 and the subsequent pointer data 50 to be different people.

In a particular arrangement, the authenticator circuit 46 provides a similarity score describing a degree of similarity between a first pointer data profile 114 derived from the initial (e.g., previous or historical) pointer data 50 in the database 44 and a new pointer data profile 114 derived from the subsequent pointer data 50. The authenticator circuit 46 calculates this similarity score over various user pointer tendencies, and the similarity score describes a distance measure in a multi-dimensional space. The authenticator circuit 46 deems authentication successful when the similarity score falls within the deviation window, i.e., a set of thresholds.

It should be understood that the particular thresholds that the authenticator circuit 46 uses for the deviation window can vary based on specific user profiles 114 in the database 44, pointer device types (e.g., an electronic mouse vs. a track ball, etc.), length of the profile 44 (e.g., the amount of processed mouse movement information), and so on. For example, the authenticator circuit 46 can apply a first deviation window when the user uses an electronic mouse and has a relatively mature profile. However, the authenticator circuit 46 can apply a second deviation window when the user uses a track ball and has not had many user sessions using the track ball.

Additionally, the distance measure and the matching criteria can vary based on the system properties of the devices, and according to the type of access being requested. Along these lines, an administrator of the server apparatus 24 can define how strict (or close) the match has to be for successful authentication. For example, in the context of banking transactions or online store purchases, the administrator may define a narrow or demanding deviation window for successful authentication. However, in the context of providing access to an online game which simply supplies access time to the game, the administrator may provide a more-forgiving deviation window.

Furthermore, the algorithms at the basis of the distance calculations can vary, and the authentication circuit 46 is preferably capable of tuning itself as the system 20 performs in the world. For example, if the authentication circuit 46 fails to successfully authenticate people that it should, the authentication circuit 46 is capable of learning this from the outcome of the procedures following the failed authentication and then re-tuning itself (e.g., based on machine learning algorithms) to relax the distance measure and/or thresholds. Conversely, if the authentication circuit 46 successfully authenticates people that it should not, the authentication circuit 46 is capable of learning and then re-tuning itself to impose a stricter distance measure and/or thresholds. Accordingly, the deviation window can be changed over time in response to external input (e.g., an administrator making an adjustment based on the amount of risk to be tolerated) and/or internal input (e.g., self-tuning by the authentication circuit 46).

It should be understood that user pointer tendencies 118 must match to some extent (e.g., be within a predetermined distance in the multi-dimensional space) if the sources are the same. However, in some arrangements, the deviation window has thresholds on both sides to enable the authenticator circuit 46 to conclude that a match is too close and likely an electronic copy of a previous user session (e.g., a recorded sequence of mouse movement events being played back). If the match is too close, the authenticator circuit 46 is capable of being configured to provide a failed authentication result.

In some arrangements, the authentication operation is transparent to users of the client apparatus 22. That is, the users go about routine tasks such as interacting with a web page through a browser. During this time, the event collector circuit 38 collects the pointer data 50 in an ongoing basis. Each time the event collector circuit 38 provides the pointer data 50 to the authenticator circuit 44, the authenticator circuit 44 performs an authentication operation. As a result, the authenticator circuit 44 may perform multiple authentication operations during the same user session. In this way, the system 20 provides continuous user authentication and is able to detect if the original user has changed. Further details will now be provided with reference to FIG. 5.

Figure 5:
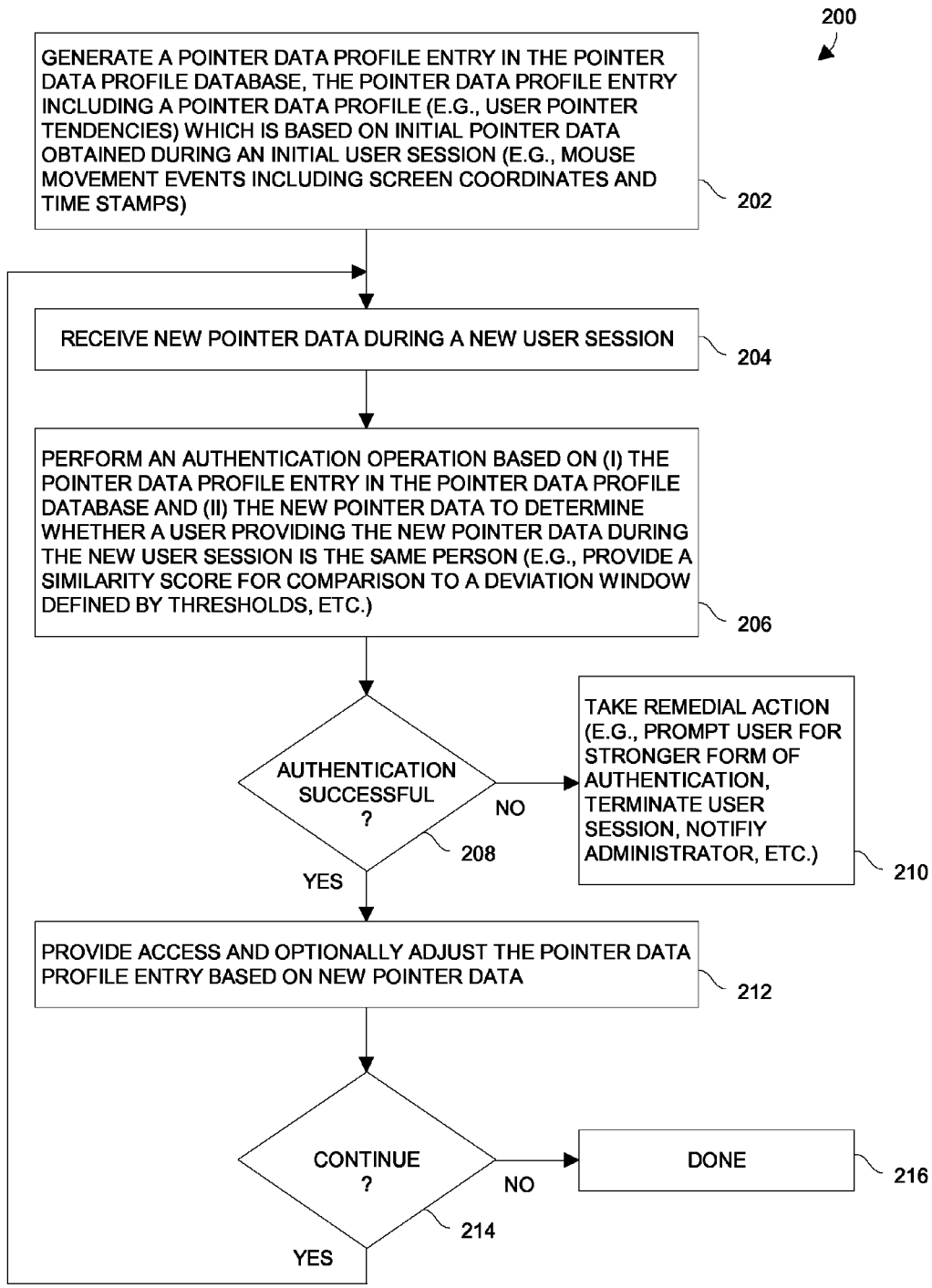
FIG. 5 is a flowchart of a procedure which is performed by circuitry which provides user authentication from computer pointer interactions.

FIG. 5 is a flowchart of a procedure 200 which is performed by the authenticator circuit 46 when providing user authentication from computer pointer interactions (see the server apparatus 24 in FIGS. 1 and 3). In step 202, during an initial user session, the authenticator circuit 46 generates a pointer data profile entry 48 in the pointer data profile database 44 in response to initial pointer data 50 obtained from the event collector circuit 38 of a client apparatus 22 (see FIGS. 1 and 2). The pointer data profile entry 48 includes, among other things, a pointer data profile 114 which includes a set of user pointer tendencies 118 based on operation of a pointing device 34 by the user during the initial user session (i.e., a sequence of mouse movement events 74). At this point, the authenticator circuit 46 is ready to provide user authentication.

In step 204, during a new user session, the authenticator circuit 46 receives new pointer data 50 from the event collector circuit 38 and an authentication request indicating user's claimed identity. In some situations, the event collector code 70 may no longer be cached in the memory 62 of the client apparatus 22 (e.g., the user may have exited the browser application 66, rebooted the client apparatus 22 between user sessions, etc.) and, in these situations, step 204 includes redeployment of the event collector code 70 by the authenticator circuit 46.

In step 206, the authenticator circuit 46 performs an authentication operation based on (i) the pointer data profile entry 48 in the pointer data profile database 44 and (ii) the new pointer data 50. An output of the authentication operation is an authentication result indicating whether a user providing the initial pointer data 50 during the first user session (step 202) and a user providing the new pointer data during the second user session (step 204) is the same person.

In step 208, the authentication circuit 46 proceeds to step 210 to take remedial action if authentication is unsuccessful, i.e., if the authentication result indicates that the users in the initial user session and the new user session are different people. However, the authentication circuit 46 proceeds to step 212 if authentication is successful, i.e., if the authentication result indicates that the user in the initial user session and user in the new user session is the same person.

In step 210, when authentication is unsuccessful, the authentication circuit 46 initiates remedial action. In some arrangements, the authentication circuit 46 signals other circuitry (e.g., an electronic agent of the server apparatus 24, an external device, etc.) to perform a stronger form of user authentication. In some arrangements, the authentication circuit 46 terminates the user session. In some arrangements, the authentication circuit 46 provides notification to an administrator (e.g., to enable the administrator to follow-up with the initial user). The particular features of these arrangements can be combined as well as integrated with other processes (e.g., multi-factor authentication, adaptive authentication, etc.).

In step 212, when authentication is successful, the authentication circuit 46 provides access to the user (e.g., allow the user to continue working) and optionally adjusts the pointer data profile 114 of the pointer data profile entry 38 based on the new pointer data 50. Such adjustments enable the pointer data profile 114 to accurately reflect the user's current pointer tendencies as the user's habits of operating the pointing device 34 evolve/change over time. For example, the user may become more proficient at operating the pointing device 34 and thus move the pointing device 34 with faster acceleration and in straighter directions in subsequent user sessions.

In step 214, the authentication circuit 46 proceeds to step 216 if the authentication circuit 46 is configured for a single round of user authentication during the new user session. This single round authentication may be appropriate for situations involving a very repetitive task during an initial part of each user session. For example, the user may perform a standard login routine and thus operate the pointing device 34 in the same way during a particular login segment of each new user session.

However, the authentication circuit 46 proceeds to step 204 if the authentication circuit 46 is configured for ongoing user authentication. Such ongoing user authentication may be appropriate for lengthier user sessions particularly if the user needs to move away from the client apparatus 22 for extended amounts of time. For example, the user may need to leave the client apparatus 22 unattended at times during the new user session. In these situations, the authentication circuit 46 repeats steps 204 through 214 in an ongoing manner to maintain reliable security. In these situations, a requester such as a separate application running on the server apparatus 24 may periodically issue an authentication request to the authenticator circuit 46 and the authenticator circuit 46 performs steps 204 through 214 in response to each authentication request.

Furthermore, during subsequent user sessions, the authenticator circuit 46 performs steps 204 through 214. Such operation provides robust and reliable user authentication over multiple user sessions.

CONCLUSION

As mentioned above, improved techniques involve providing user authentication from computer pointer interactions. Such pointer interactions (e.g., mouse movement events) can be collected from standard pointing devices 34 such as an electronic mouse, a touch-based track pad, a trackball, a scroll wheel, or the like. Initially, electronic circuitry creates a user profile 114 from pointer input 50 collected when a user operates a pointing device 34. Then, during a subsequent user session, the electronic circuitry compares further pointer input 50 collected from the pointing device 34 during that subsequent session to the user profile 114 to authenticate the user. Since computing devices typically include pointing devices 34, there is no need for any extra specialized hardware. Additionally, how the user interacts with a pointing device 34 is generally difficult to copy or imitate (i.e., steal) thus making the pointing device interactions a reliable authentication factor. Furthermore, there is typically no expertise or training required to become proficient at operating and maintaining a pointing device thus minimizing the burden, if any, on the user.

While various embodiments of the invention have been particularly shown and described, it will be understood by those skilled in the art that various changes in form and details may be made therein without departing from the spirit and scope of the invention as defined by the appended claims.

For example, the event collector code 70 was primarily described above as being deployed in the form of a script (e.g., Javascript) for interpretation by a scripting engine (e.g., a Javascript interpreter). Other deployment techniques are suitable for use as well such as traditional software installations from a computer program product (e.g., executable instructions which, when installed on a client apparatus 22, direct the operation of the client apparatus 22). In this context, the event collector circuit 38 is capable of running in the background to collect and send pointer data 50 from all areas of the electronic display rather than simply from within a browser window.

Additionally, it should be understood that the various user authentication techniques were described above in the context of a client/server environment. Such an environment is well suited for multi-client situations where multiple users operate multiple workstations or client apparatus 22 (e.g., see FIG. 1). Nevertheless, other configurations and arrangements are suitable as well such an environment in which the event collector circuit 38 and the authenticator circuit 46 are co-located in the same equipment.

Furthermore, nothing precludes the techniques from being implemented on equipment other than computers. For example, the various techniques may involve relative small, portable electronic devices such as handheld tablets and game controllers. As another example, the various techniques may involve relatively large and/or specialized equipment as large display screen environments, vehicle or large equipment operation, and so on. In at least some arrangements, at least portions of the event collector circuit 38 and/or the authenticator circuit 46 are implemented in hardware (e.g., ASICs, field programmable gate arrays, analog circuitry, discrete logic, combinations thereof, etc.).

Additionally, it should be understood that the particular user pointer tendencies 118 described above were provided by way of example only. Other user pointer tendencies are suitable for use as well. By selecting particular user pointer tendencies 118 which are derivable from collected mouse movement events 74, the authenticator circuit 46 is able to effectively analyze how the user uses the pointing device 34 to interact with the client apparatus 22. Does the user move the mouse slowly and deliberately in straight lines? Does the user change direction quickly? When the user moves the pointing device 34 to click a button, does the user slow down as the pointer graphic approaches the button and then click, or does the user move the pointer graphic at uniform speed towards the button and abruptly stop? Does the user have a tendency to move the pointer graphic past the button and loop back to click the button? It should be understood that some pointer tendency characteristics are even more easily defined by close mathematical inspection because they do not correspond simply to an observable pointer movement trait such as curves or acceleration. Advantageously, the authenticator circuit 46 is able to identify and characterize these user pointer tendencies without interfering with the way the user normally interacts with the pointing device 34. Such modifications and enhancements are intended to belong to various embodiments of the invention.

What is claimed is:

1. A method of providing user authentication, the method comprising:
   generating, by an authenticator circuit, a pointer data profile entry in a pointer data profile database, the pointer data profile entry including a pointer data profile which is based on first pointer data obtained during a first user session;
   receiving, by the authenticator circuit, new pointer data during a second user session; and
   performing, by the authenticator circuit, an authentication operation based on (i) the pointer data profile entry in the pointer data profile database and (ii) the new pointer data to determine whether a user providing the first pointer data during the first user session and a user providing the new pointer data during the second user session is the same person;
   wherein the second user session includes a login segment to authenticate a user, and after successful user authentication, a separate ongoing segment to gather new pointer data after the login segment of the second user session;
   wherein the first pointer data includes a first series of movement events collected by an event collector circuit from a pointing device during the first user session;
   wherein the new pointer data includes a second series of movement events collected by the event collector circuit from the pointing device during the second user session;
   wherein receiving the new pointer data during the second user session includes obtaining the second series of movement events by the authenticator circuit from the event collector circuit while the pointing device directs movement of a pointer graphic on a display screen during the second user session;
   wherein receiving the new pointer data includes acquiring the new pointer data during the login segment prior to the ongoing segment;
   wherein performing the authentication operation includes successfully authenticating the user providing the new pointer data during the login segment and prior to the ongoing segment; and
   wherein the method further comprises, after the login segment and during the ongoing segment, receiving additional pointer data and performing another authentication operation based on the pointer data profile entry in the pointer data profile database and the additional pointer data.

2. A method as in claim 1 wherein the authenticator circuit and the pointer data profile database form a portion of a server apparatus;
   wherein the event collector circuit and the pointing device form a portion of a client apparatus; and
   wherein obtaining the second series of movement events includes collecting mouse movement events by the authenticator circuit from the event collector circuit includes acquiring the second series of mouse movement events as a network transmission to the server apparatus from the client apparatus through a computer network.

3. A method as in claim 2 wherein generating the pointer data profile entry in the pointer data profile database includes:
   deriving, by the authenticator circuit of the server apparatus, a set of user pointer tendencies from the first series of mouse movement events, and
   storing the pointer data profile entry in the pointer data profile database in a non-volatile manner, the pointer data profile entry including the set of user pointer tendencies.

4. A method as in claim 3 wherein deriving the set of user pointer tendencies includes outputting:
   an acceleration characteristic which identifies a pointer acceleration attribute,
   a speed uniformity characteristic which identifies a pointer speed uniformity attribute, and
   a directional characteristic which identifies a pointer directional attribute; and
   wherein the acceleration characteristic, the speed uniformity characteristic, and the directional characteristic are different from each other.

5. A method as in claim 3 wherein the pointer data profile database includes multiple pointer data profile entries, each pointer data profile entry including (i) a user identifier which identifies a user and (ii) user pointer tendencies corresponding to that user; and
   wherein storing the pointer data profile entry in the pointer data profile database includes writing (i) a particular user identifier which uniquely identifies a particular user among multiple users and (ii) the set of user pointer tendencies, as at least part of the pointer data profile entry, in the pointer data profile database.

6. A method as in claim 5, further comprising:
   after the pointer data profile entry is stored in the pointer data profile database and before the authentication operation is performed, receiving an authentication request and extracting the particular user identifier from the authentication request.

7. A method as in claim 6 wherein the authentication operation includes:
   in response to the authentication request, locating the pointer data profile entry in the pointer data profile database based on the particular user identifier extracted from the authentication request, retrieving the set of user pointer tendencies from the pointer data profile database, and performing a comparison operation which determines whether the second series of mouse movement events correlates with the retrieved set of user pointer tendencies.

8. A method as in claim 7 wherein the authentication operation further includes:
   outputting an authentication result which indicates (i) successful authentication when the second series of mouse movement events matches with the retrieved set of user pointer tendencies within a deviation window, and (ii) failed authentication when the second series of mouse movement events does not match with the retrieved set of user pointer tendencies within the deviation window.

9. A method as in claim 8, further comprising:
   providing access to particular data when the authentication result indicates successful authentication, and
   denying access to the particular data when the authentication result indicates failed authentication.

10. A method as in claim 8, further comprising:
providing a prompt for a further form of authentication when the authentication result indicates failed authentication.

11. A method as in claim 8, further comprising:
receiving, by the authenticator circuit, subsequent pointer data during the second user session; and
performing, by the authenticator circuit, another authentication operation based on (i) the pointer data profile entry in the pointer data profile database and (ii) the subsequent pointer data to determine whether the user providing the first pointer data during the first user session and the user providing the new pointer data during the second user session continue to be the same.

12. A method as in claim 2, further comprising:
deploying event collector code from the authenticator circuit to the client apparatus, processing circuitry of the client apparatus forming the event collector circuit when the processing circuitry of the client apparatus runs the event collector code.

13. A method as in claim 12 wherein the processing circuitry of the client apparatus is constructed and arranged to run a web browser having a Javascript interpreter to display web pages on the display screen; and
wherein obtaining the second series of mouse movement events includes dynamically acquiring, by the authenticator circuit of the server apparatus, the second series of mouse movement events from the event collector circuit in response to the Javascript interpreter operating based on the deployed event collector code.

14. A method as in claim 1 wherein gathering the new pointer data in a separate ongoing segment of the second user session includes gathering the new pointer data in a manner that is transparent to the user while the user performs useful work unrelated to the login segment.

15. A method as in claim 1 wherein gathering the new pointer data in a separate portion of the second user session further includes gathering the new pointer data at a set of time periods during the separate ongoing segment of the second user session.

16. A method as in claim 1 wherein gathering the new pointer data in a separate ongoing segment of the second user session further includes using the new pointer data to update the pointer data profile database during the ongoing segment, including re-tuning a similarity score, a tendency value and a habit value.

17. A computer program product to provide user authentication, the computer program product comprising a non-transitory computer readable storage medium which stores a set of instructions which is constructed and arranged to direct operation of a computerized device, the set of instructions including:
instructions to generate a pointer data profile entry in a pointer data profile database, the pointer data profile entry including a pointer data profile which is based on first pointer data obtained during a first user session;
instructions to receive new pointer data during a second user session; and
instructions to perform an authentication operation based on (i) the pointer data profile entry in the pointer data profile database and (ii) the new pointer data to determine whether a user providing the first pointer data during the first user session and a user providing the new pointer data during the second user session is the same person;
wherein the second user session includes a login segment to authenticate a user, and after successful user authentication, a separate ongoing segment to gather new pointer data for a continued authentication operation after the login segment of the second user session;
wherein the first pointer data includes a first series of movement events collected by an event collector circuit from a pointing device during the first user session;
wherein the new pointer data includes a second series of movement events collected by the event collector circuit from the pointing device during the second user session;
wherein receiving the new pointer data during the second user session includes obtaining the second series of movement events by the authenticator circuit from the event collector circuit while the pointing device directs movement of a pointer graphic on a display screen during the second user session;
wherein receiving the new pointer data includes acquiring the new pointer data during the login segment prior to the ongoing segment;
wherein performing the authentication operation includes successfully authenticating the user providing the new pointer data during the login segment and prior to the ongoing segment; and
wherein the method further comprises, after the login segment and during the ongoing segment, receiving additional pointer data and performing another authentication operation based on the pointer data profile entry in the pointer data profile database and the additional pointer data.

18. A computer program product as in claim 17 wherein the first pointer data includes a first series of mouse movement events collected by an event collector circuit from a pointing device during the first user session;
wherein the new pointer data includes a second series of mouse movement events collected by the event collector circuit from the pointing device during the second user session; and
wherein the instructions to receive the new pointer data during the second user session include instructions to obtain the second series of mouse movement events from the event collector circuit while the pointing device directs movement of a pointer graphic on a display screen during the second user session.

19. A computer program product as in claim 18 wherein the set of instructions further includes:
instructions to deploy event collector code to a client apparatus, processing circuitry of the client apparatus forming the event collector circuit when the processing circuitry of the client apparatus runs the event collector code.

20. A computer program product as in claim 19 wherein the processing circuitry of the client apparatus is constructed and arranged to run a web browser having a Javascript interpreter to display web pages on the display screen; and
wherein the instructions to obtain the second series of mouse movement events from the event collector circuit include instructions to dynamically acquire the second series of mouse movement events from the event collector circuit in response to the Javascript interpreter operating based on the deployed event collector code.

21. A server apparatus, comprising:
a network interface;
memory which stores a pointer data profile database; and
processing circuitry coupled to the network interface and the memory, the processing circuitry being constructed and arranged to:
generate a pointer data profile entry in the pointer data profile database, the pointer data profile entry including a pointer data profile which is based on first pointer data obtained through the network interface during a first user session, receive new pointer data through the network interface during a second user session, and perform an authentication operation based on (i) the pointer data profile entry in the pointer data profile database and (ii) the new pointer data to determine whether a user providing the first pointer data during the first user session and a user providing the new pointer data during the second user session is the same person;

wherein the second user session includes a login segment to authenticate a user, and after successful user authentication, a separate ongoing segment to gather new pointer data for a continued authentication operation after the login segment of the second user session;

wherein the first pointer data includes a first series of movement events collected by an event collector circuit from a pointing device during the first user session;

wherein the new pointer data includes a second series of movement events collected by the event collector circuit from the pointing device during the second user session;

wherein receiving the new pointer data during the second user session includes obtaining the second series of movement events by the authenticator circuit from the event collector circuit while the pointing device directs movement of a pointer graphic on a display screen during the second user session;

wherein receiving the new pointer data includes acquiring the new pointer data during the login segment prior to the ongoing segment;

wherein performing the authentication operation includes successfully authenticating the user providing the new pointer data during the login segment and prior to the ongoing segment; and wherein the method further comprises, after the login segment and during the ongoing segment, receiving additional pointer data and performing another authentication operation based on the pointer data profile entry in the pointer data profile database and the additional pointer data.

22. A client apparatus, comprising:
a network interface;
a pointing device; and
processing circuitry coupled to the network interface and the pointing device, the processing circuitry being constructed and arranged to:

provide first pointer data during a first user session to generate a pointer data profile entry in a pointer data profile database, the pointer data profile entry including a pointer data profile which is based on the first pointer data obtained during a first user session, provide new pointer data through the network interface during a second user session, and request authentication based on (i) the pointer data profile entry in the pointer data profile database and (ii) the new pointer data to determine whether a user providing the first pointer data during the first user session and a user providing the new pointer data during the second user session is the same person;

wherein the second user session includes a login segment to authenticate a user, and after successful user authentication, a separate ongoing segment to gather new pointer data for a continued authentication operation after the login segment of the second user session;

wherein the first pointer data includes a first series of movement events collected by an event collector circuit from a pointing device during the first user session;

wherein the new pointer data includes a second series of movement events collected by the event collector circuit from the pointing device during the second user session;

wherein receiving the new pointer data during the second user session includes obtaining the second series of movement events by the authenticator circuit from the event collector circuit while the pointing device directs movement of a pointer graphic on a display screen during the second user session;

wherein receiving the new pointer data includes acquiring the new pointer data during the login segment prior to the ongoing segment;

wherein performing the authentication operation includes successfully authenticating the user providing the new pointer data during the login segment and prior to the ongoing segment; and wherein the method further comprises, after the login segment and during the ongoing segment, receiving additional pointer data and performing another authentication operation based on the pointer data profile entry in the pointer data profile database and the additional pointer data.

* * * * *